A. GOODYEAR.

Grain Binder.

No. 50,814.

5 Sheets—Sheet 1.

Patented Nov. 7, 1865.

A. GOODYEAR.
Grain Binder.

No. 50,814.

5 Sheets—Sheet 2.

Patented Nov. 7, 1865.

Witnesses:
Mary A. Hine
Rufus H. Sanford

Inventor:
Albert Goodyear
by
John E. Earle

A. GOODYEAR.
Grain Binder.
No. 50,814.
5 Sheets—Sheet 3.
Patented Nov. 7, 1865.
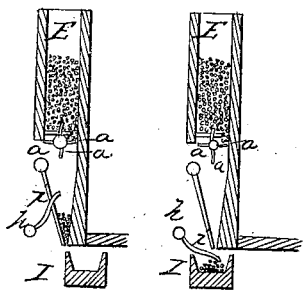
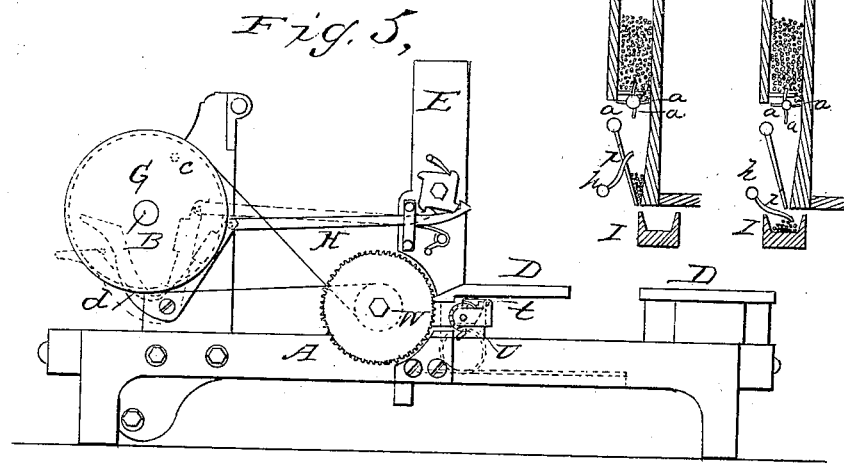
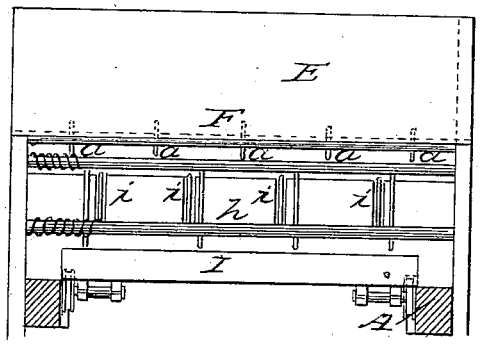
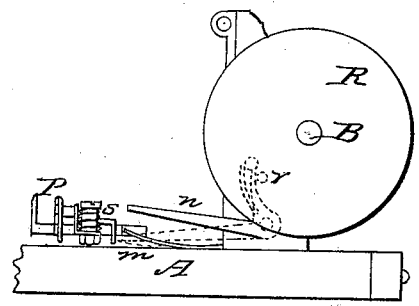
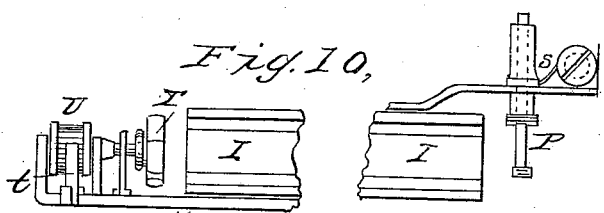

A. GOODYEAR.
Grain Binder.
No. 50,814.
5 Sheets—Sheet 4.
Patented Nov. 7, 1865.
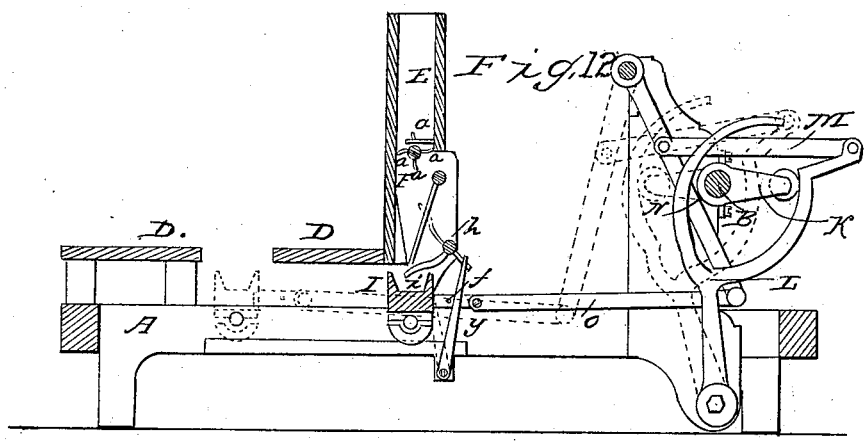
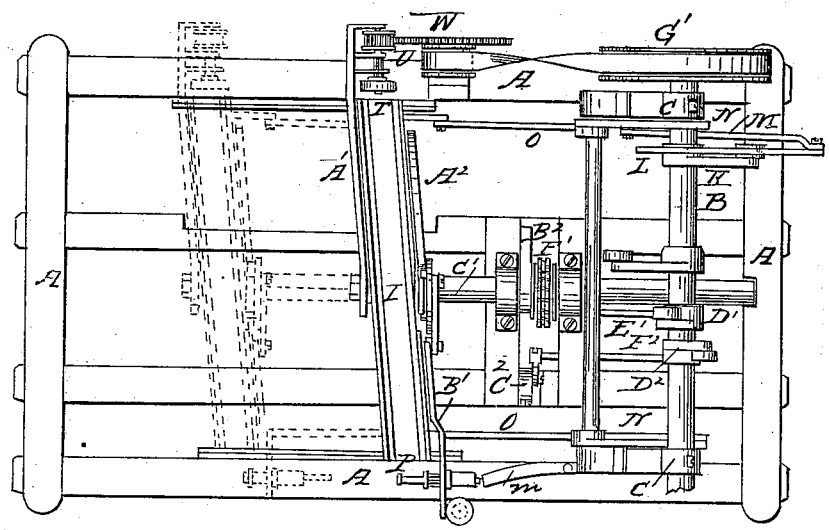

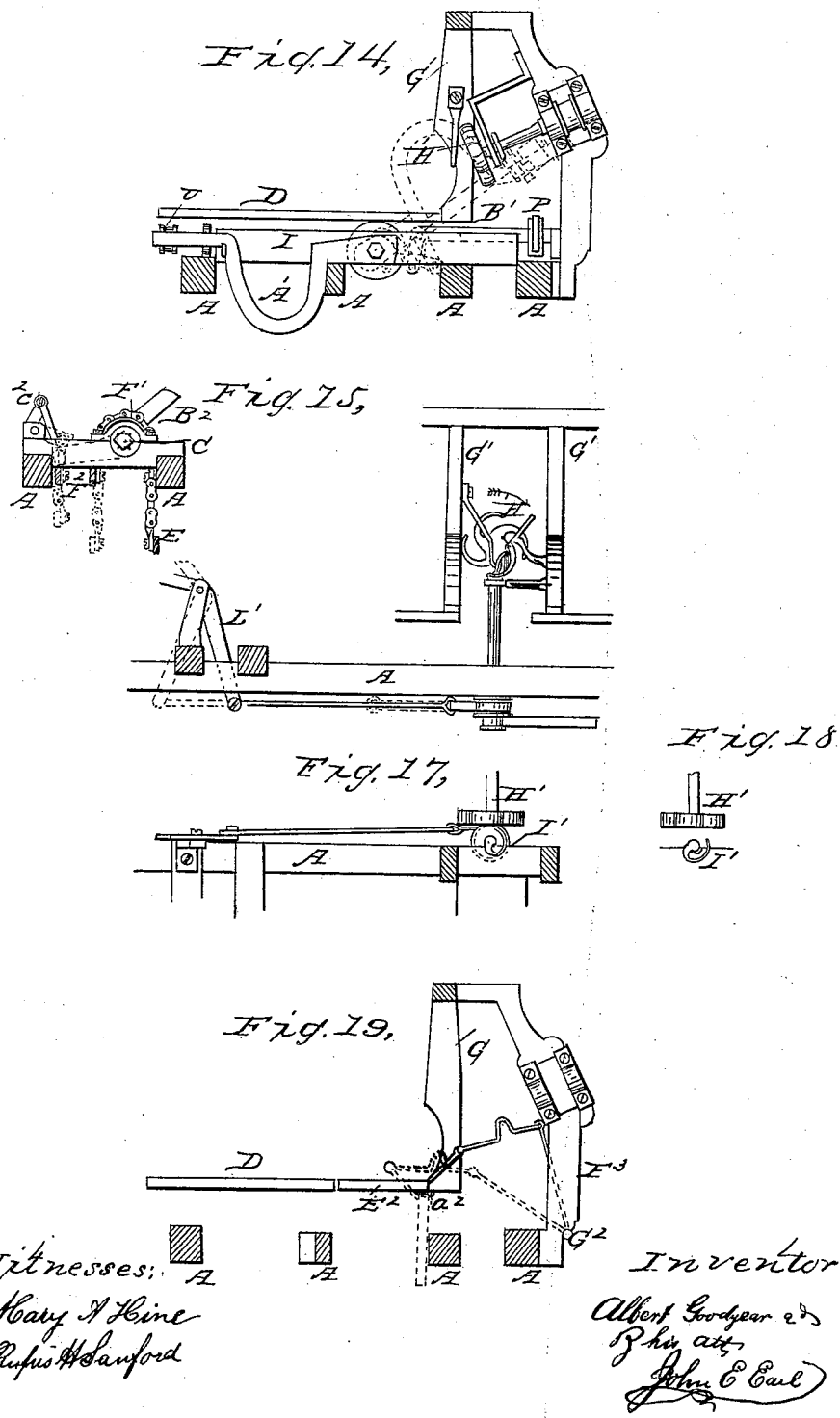

UNITED STATES PATENT OFFICE.

ALBERT GOODYEAR, 2D, OF HAMDEN, CONNECTICUT.

IMPROVEMENT IN MACHINES FOR BINDING GRAIN.

Specification forming part of Letters Patent No. 50,814, dated November 7, 1865.

*To all whom it may concern:*

Be it known that I, ALBERT GOODYEAR, 2d, of Hamden, in the county of New Haven and State of Connecticut, have invented a new and useful Improvement in Machines for Binding Grain; and I do hereby declare the following to be a full, clear, and exact description of the same when taken in connection with the accompanying drawings and the letters of reference marked thereon, and which said drawings constitute part of this specification, and represent, in—

Figure 1:
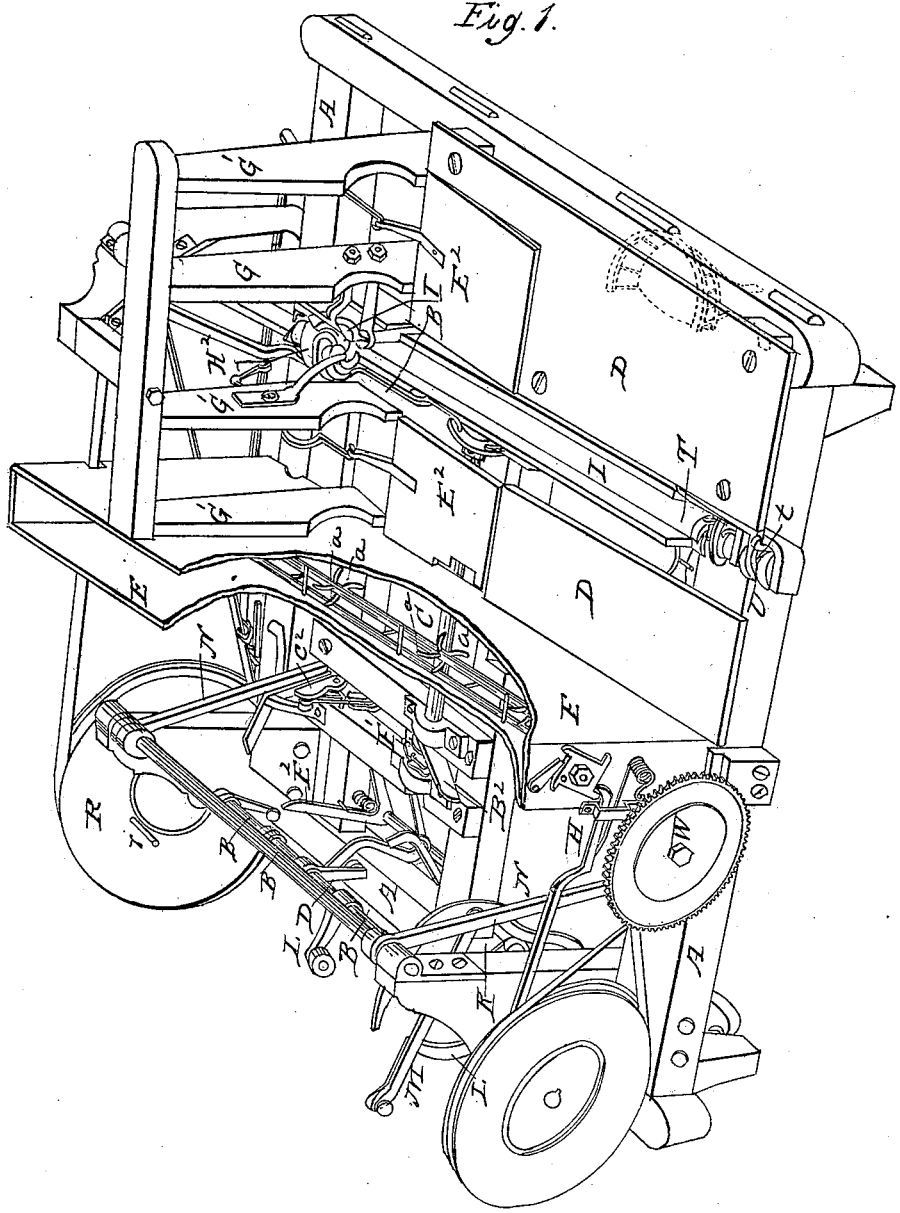
Figure 2:
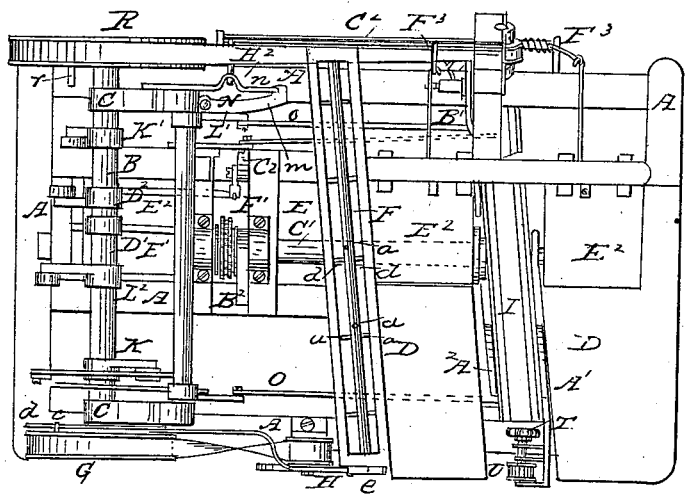
Figure 3:
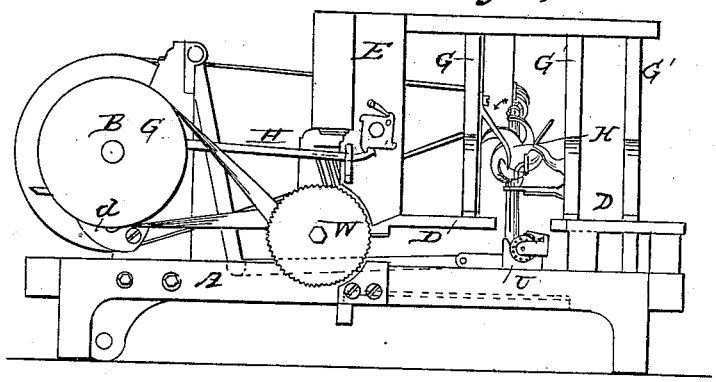
Figure 4:
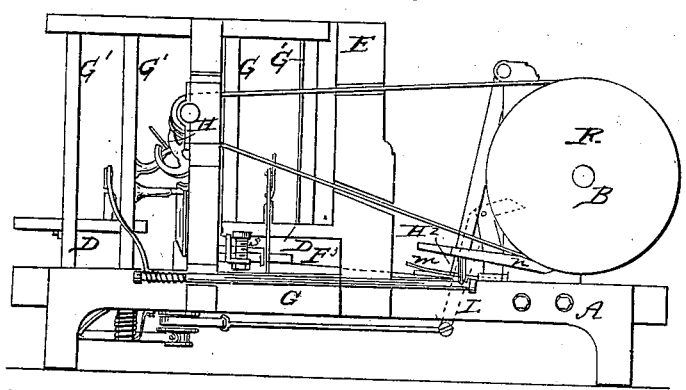

Figure 1, a perspective view; Fig. 2, a plan or top view; Fig. 3, a front side view; Fig. 4, a back side view; Figs. 5, 6, 7, 8, 9, 10, and 11, detached views to illustrate the forming of the band; Fig. 12, a sectional view, and Fig. 13, a plan view, illustrating the transference of the band from the place of formation to place of use; Figs. 14 and 15, gathering the grain into a bundle preparatory to binding; Figs. 16, 17, and 18, securing the band around the bundle; and in Fig. 19, discharging the bound bundle from the machine.

Similar letters indicate corresponding parts.

My invention relates to improvements in machinery for bundling and binding grain; and consists in automatic mechanism which first twists a band of straw, then gathers the grain into a bundle, places the said twisted straw band around the said bundle, twisting the two ends of the said bands together to secure the bundle, in similar manner as is usually done by hand.

To enable others skilled in the art to construct and use my machine, I will proceed to describe the same as illustrated in the accompanying drawings.

A is the frame or bed of the machine, which may be attached to or made a part of an ordinary reaping-machine. B is the driving-shaft, supported and made to revolve in proper bearings C. D is the platform, upon which the grain is placed automatically from the reaper or otherwise, so as to lie across the opening in the platform D. E is a box which contains the straw from which the band is to be made. (Shown in section in Figs. 6 and 7.) Through the said box E, I place a shaft, F, provided with fingers $a$, as seen in Figs. 6, 7, and 8. The shaft F is made to revolve through the action of a pawl, H, operated by the stud $c$ on the wheel G, (see Fig. 2,) through the lever $d$, each revolution of the wheel G moving the said pawl H as denoted in Fig. 5. In this movement the pawl catches and turns the toothed wheel $e$, which is fixed to the shaft F, one-fourth round, more or less, in which movement of the said shaft F a portion of the straw in the box E is caught by the fingers $a$, and drawn down from the box and falls upon the rack below, as denoted in Fig. 6. I is the box in which the band is formed, and traverses from below the box E, where the band is formed, as seen in Figs. 12 and 13, to the open space in the platform, as seen in the said Figs. 12 and 13. The said box I is moved by the action of the cam K through the levers L, M, N, and O, in their operation, moving as denoted in Fig. 12. As the said box I returns from its position to that in Fig. 12 a stud, $f$, strikes the lever $g$, moving it as denoted, which said lever $g$, acting upon the shaft $h$, turns the said shaft $h$, upon which are several fingers $i$, (see Fig. 6,) to the position denoted in Fig. 7, thus carrying the straw from the rack (see Fig. 6) down into the box I, as denoted in Fig. 7. Thus placed in the box, one end of the straw is grasped by the clasp P. (See Fig. 9.) The said clasp is attached to a lever, $B^1$. (See Figs. 13 and 14.) As the box I comes to the position denoted in Fig. 12, the said clasp P comes against the spring $m$, which opens it to the position denoted in Fig. 9, and is released to close upon the straw, by the lever $n$ bearing down the said spring $m$, as denoted in Fig. 9. The said lever $n$ is moved to operate thus by a stud, $r$, on the wheel R, the said clasp closing by the action of the spring $s$. (See Fig. 10.) This secures one end of the straw preparatory to twisting the band. At the opposite end of the box I (see Fig. 10) is placed a twister, T, (see Fig. 11,) which is made to revolve through the pinion U coming in contact with the toothed wheel W, (see Fig. 13,) which said toothed wheel W is made to revolve by a belt running from the wheel G. The twister T, (see Fig. 13,) revolving in the direction denoted by the arrow, gathers the straw with its several teeth or fingers, and twists the straw so long as it is made to revolve. When sufficiently twisted a pawl, $t$, serves to prevent the band from untwisting. Thus completed, the band is carried by the movement of the box I, before described, to the open space in the platform D. Connected with the said box I, and traveling with it, is placed the gatherer $A^1$, upon the outer end of which the twister T is fixed. Upon the opposite side of the box I is placed the lever $B^1$, to which the clasp P is fixed. The gatherer $A^1$ is fixed to a square shaft, $C^1$, (see Fig. 15,) which, by the action of the cam $D^1$ through a lever, $E^1$, and the chain-wheel $F^1$ upon the said shaft $C^1$, is caused to make a partial revolution, as denoted in Fig. 15, carrying with it the gatherer $A^1$ and twister T, which holds one end of the band to the position denoted in Fig. 14, by which movement of the gatherer the grain lying upon the platform is collected within the curved part of the said gatherer and pressed into a bundle against the posts $G^1$. A second lever or gatherer, $A^2$, is attached to the shaft $C^1$ upon the opposite side of the box I, (see Fig. 13,) to aid in gathering the grain. A lever, $B^2$, (see Figs. 2 and 15,) is secured to the shaft $C^1$, and is turned with the said shaft until it is passed over sufficiently to allow the lever $C^2$ (see Fig. 15) to be drawn down upon it in order to add to the pressure applied to compress the bundle. The lever $C^2$ is operated by the cam $D^2$ through the lever $F^2$. (See Fig. 13.) By the same movement of the said shaft $C^1$ the lever $B^1$ with the clasp P holding the other end of the band is carried up to the position denoted in Fig. 14. The diagonal position in which the box I is placed, and the relative position which the twister T and the clasp P thereby have to each other, are such that when the twister and clasp are carried to the position denoted in Fig. 14, the two ends of the band will be carried to opposite sides of a second twister, $H^1$. (Seen in Figs. 3 and 16.) The said twister $H^1$ is caused to revolve by a band from the wheel R, as seen in Figs. 2 and 4. The fingers of the twister $H^1$ revolving in the direction denoted by the arrow, will catch the two ends of the band, drawing them from the twister T, and clasp P will twist them together, and when sufficiently twisted the band $I'$ (see Figs. 16, 17, and 18) will by the action of the cam $K'$ through the lever $L^1$ be turned from the position denoted in Fig. 17 to that in Fig. 18, and tuck the twisted ends under the band in similar manner as would be done by hand. When the grain is thus bound the gatherer, with the twister T and clasp P, returns to the position denoted in Fig. 14 by the action of the cam $L^2$. Thence the box I, with the gatherer, &c., attached, is moved back, as before described, to receive and twist a second band, while the bundle thus bound is left upon the traps $E^2$ for the operation of said trap. (See Fig. 19.) The said traps are hinged to the frame at $a^2$, and are supported in the position denoted by levers $F^3$ (see Fig. 4) attached to a shaft, $G^2$, upon which a spring supports the traps $E^2$. As the lever $n$ descends to release the clasp P, as before described, it (the lever $n$) strikes the lever $H^2$ on the said shaft $G^2$, (see Fig. 2,) and turns the said shaft with its levers $F^3$, and with them the traps $E^2$, to the position denoted in Fig. 19, which movement of the traps $E^2$ permits the bundle of grain to fall through the platform to the ground beneath. This done, the release of the lever $n$ from the action of the stud $r$ (see Fig. 9) permits the traps, by the action of the spring on the shaft $G^2$, to return to the position in Fig. 19, when, sufficient quantity of grain for a second bundle being placed upon the platform D, as before described, will by the continuous action of the machine be gathered up, bundled, bound, and dropped in like manner as the first described, and so continue so long as the machine is in motion and grain supplied thereto.

I have described the band as clasped firmly at one end while the twister T twists at the other end, but a twister may be used at both ends.

My machine may be attached to an ordinary reaper, and receive its power therefrom; or it may be used independent of a reaper, power being applied in any convenient or known manner, which will readily suggest itself to those skilled in the use of machinery.

Many of the parts of my machine may be changed, to improve or modify the mechanical workings thereof, without changing the general principle herein described.

I have described my machine as automatically receiving the straw which is to form the band, instead of which the straw may be placed in the box I by hand.

For the comfort or convenience of the operator a seat may be applied to the platform, as denoted in Fig. 1.

I do not broadly claim an automatic hand operating for the purpose of tucking under the twisted ends of the band. Neither do I broadly claim gathering grain into bundles, and binding by a band, the two ends of which are twisted together.

Having, therefore, fully described my invention, what I claim as new and useful, and desire to obtain by Letters Patent, is—

1. The twister T, constructed substantially as described, so as to gather the straw and twist the band, in the manner described.

2. The combination of an apparatus for twisting the band, substantially as described, with a mechanism for gathering the grain to be bound into bundles.

3. The twister $H^1$, in combination with the twister T, for the purpose specified.

ALBERT GOODYEAR, 2D.

Witnesses:
JOHN E. EARLE,
MARY A. HINE.